United States Patent
Agrawal et al.

(10) Patent No.: US 12,328,500 B2
(45) Date of Patent: Jun. 10, 2025

(54) MULTI-CAMERA ELECTRONIC DEVICE WITH AUTOMATIC IMAGE CAPTURE BASED ON GESTURE DETECTION

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 207 days.

(21) Appl. No.: 18/317,307

(22) Filed: May 15, 2023

(65) Prior Publication Data

US 2024/0388793 A1 Nov. 21, 2024

(51) Int. Cl.
*H04N 23/66* (2023.01)
*G06F 3/01* (2006.01)

(52) U.S. Cl.
CPC ............. *H04N 23/66* (2023.01); *G06F 3/017* (2013.01)

(58) Field of Classification Search
CPC ...... H04N 23/66; H04N 23/61; H04N 23/611; H04N 23/667; H04N 23/698; G06F 3/017
See application file for complete search history.

(56) References Cited

U.S. PATENT DOCUMENTS

| | | | |
|---|---|---|---|
| 10,057,483 B2* | 8/2018 | Her | H04N 23/61 |
| 2016/0156838 A1* | 6/2016 | Cheng | H04N 23/90 |
| | | | 348/222.1 |
| 2021/0165908 A1* | 6/2021 | Luo | G06F 21/6245 |

* cited by examiner

*Primary Examiner* — Ahmed A Berhan
(74) *Attorney, Agent, or Firm* — Isidore PLLC

(57) ABSTRACT

An electronic device, a method and a computer program product enable capturing of an image by a first camera in response to detecting a gesture by a second camera. The method includes, in response to activating a first camera having a first field of view (FOV) to an image capturing mode, activating the second camera to capture an image stream within a second FOV that is wider than the first FOV. The method further includes monitoring the image stream to detect movements and identifying a gesture among movements detected within the image stream. The method further includes determining that the gesture is associated with triggering the first camera to capture images within the first FOV and in response to determining that the gesture is associated with triggering the first camera to capture images within the first FOV, capturing, via the first camera, a first image within the first FOV.

20 Claims, 10 Drawing Sheets

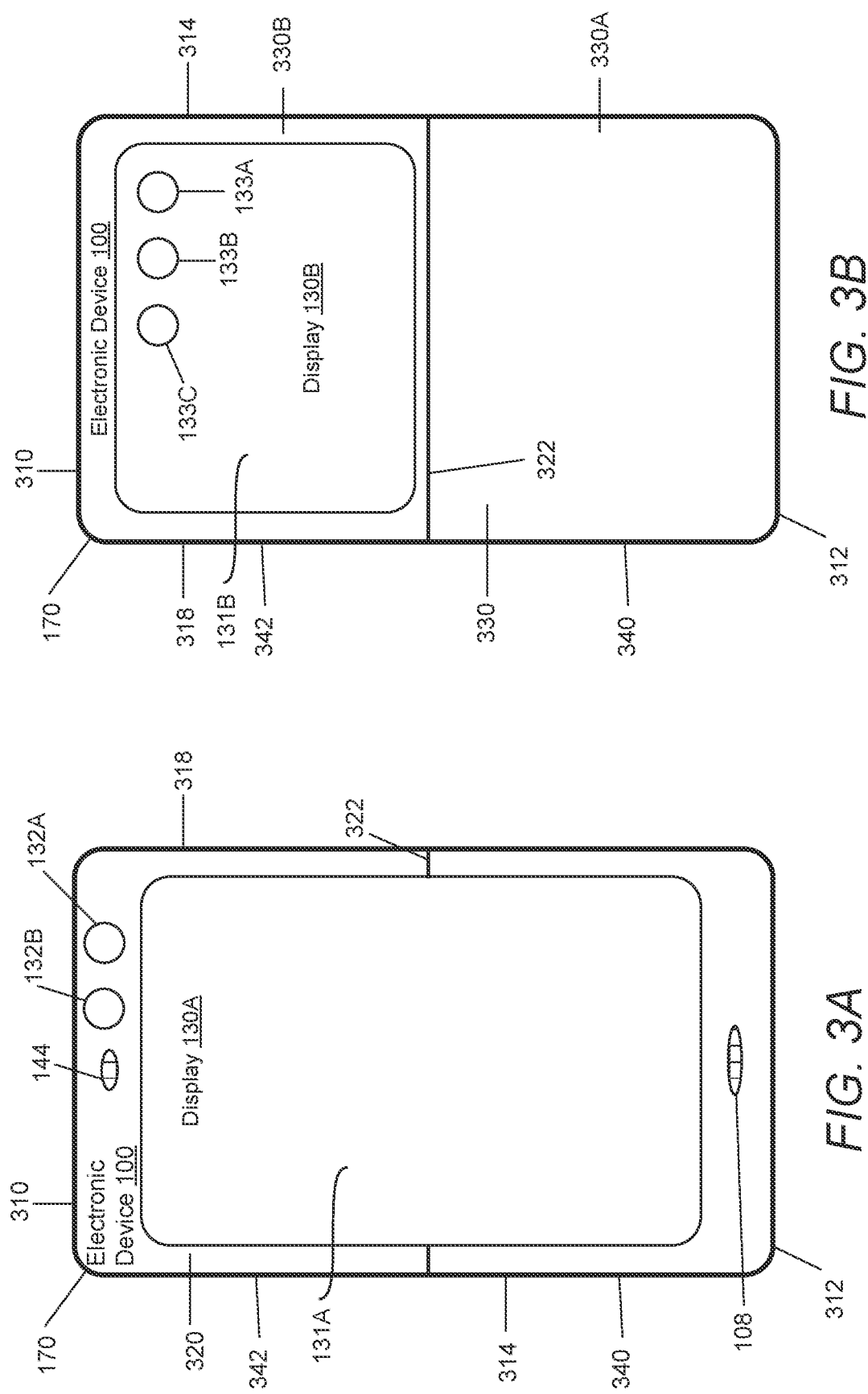

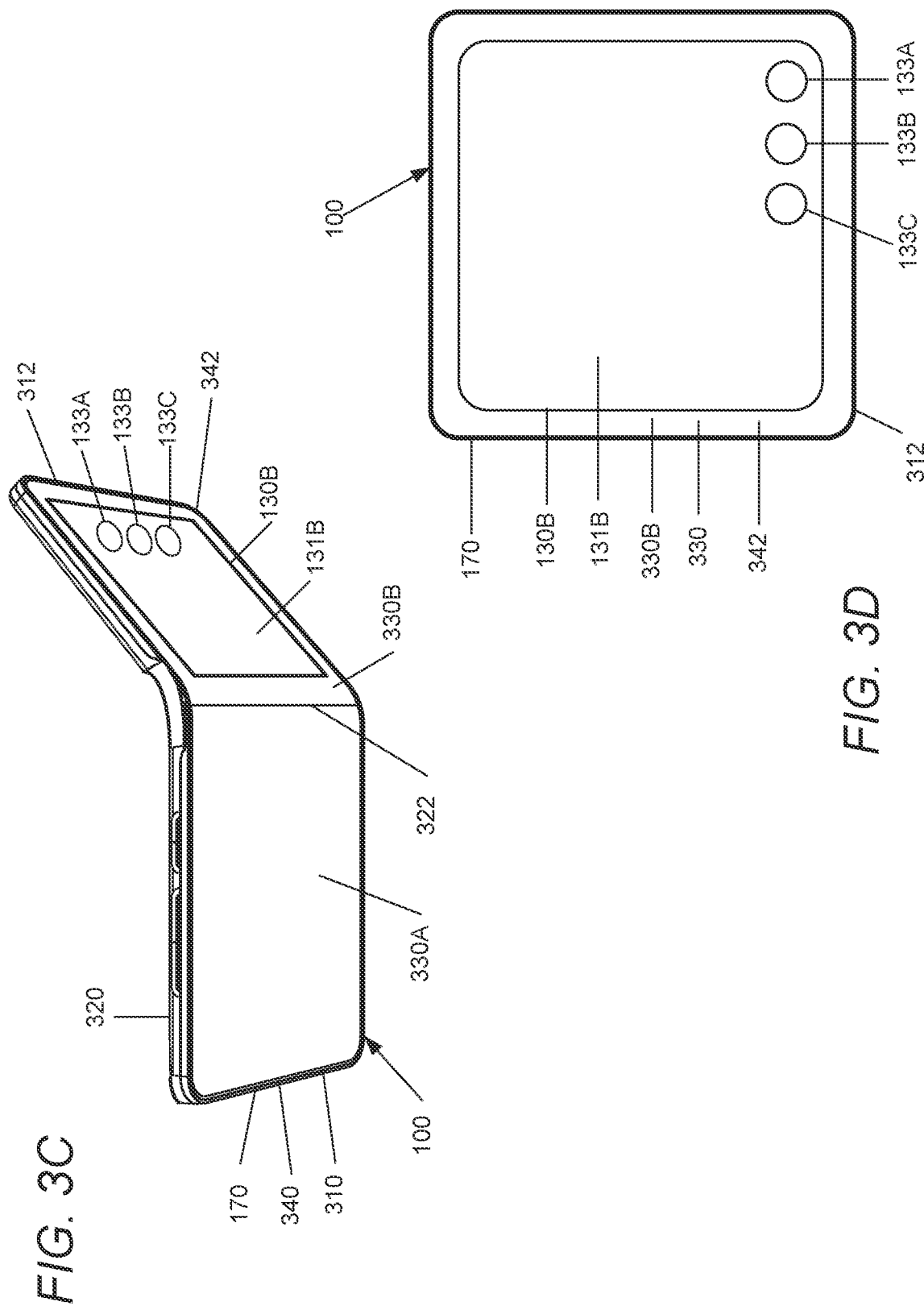

MULTI-CAMERA ELECTRONIC DEVICE WITH AUTOMATIC IMAGE CAPTURE BASED ON GESTURE DETECTION

BACKGROUND

1. Technical Field

The present disclosure generally relates to electronic devices with multiple cameras and in particular to multi-camera electronic devices that support capturing images based on detected gestures.

2. Description of the Related Art

Electronic devices, such as cell phones, tablets, and laptops, are widely used for communication and data transmission. These electronic devices support various communication modes/applications, such as text messaging, audio calling and video calling. Electronic devices typically include one or more cameras that are used for taking pictures and videos and for supporting video calling or image content streaming. Many conventional electronic devices have at least one front camera and one or more rear cameras. With electronic devices that have multiple front or rear cameras, the different front or rear cameras can have lenses that are optimized for various focal angles and distances. For example, one camera can have a regular angle lens and another camera can have a wide-angle lens. It is common for electronic device users to take photos of themselves, which are colloquially referred to as a selfie or self-photo. To take a self-photo, the user holds the electronic device out in front of the user with the camera lens directed at the user, and the user then has to manually touch a shutter button or a shutter icon of the electronic device to capture an image. Unfortunately, reaching the shutter button or shutter icon can be difficult with the electronic device extended away from the user. In addition, reaching for the shutter button or shutter icon can cause the electronic device to move resulting in the camera aim being off of the desired subject. The gaze of the user is also adjusted as the user has to look at the device to visually locate the shutter button or icon to take the self-photo.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is an example illustration of the front of an electronic device with multiple front cameras, according to one or more embodiments;

FIG. 3B is an example illustration of the rear of an electronic device with multiple rear cameras and a display, according to one or more embodiments;

FIG. 3C is an example illustration of the electronic device of FIGS. 3A and 3B in a partially folded position, according to one or more embodiments;

FIG. 3D is an example illustration of the electronic device of FIGS. 3A and 3B in a fully folded position, presenting the rear cameras on an external surface of the housing, according to one or more embodiments;

DETAILED DESCRIPTION

Figure 1:
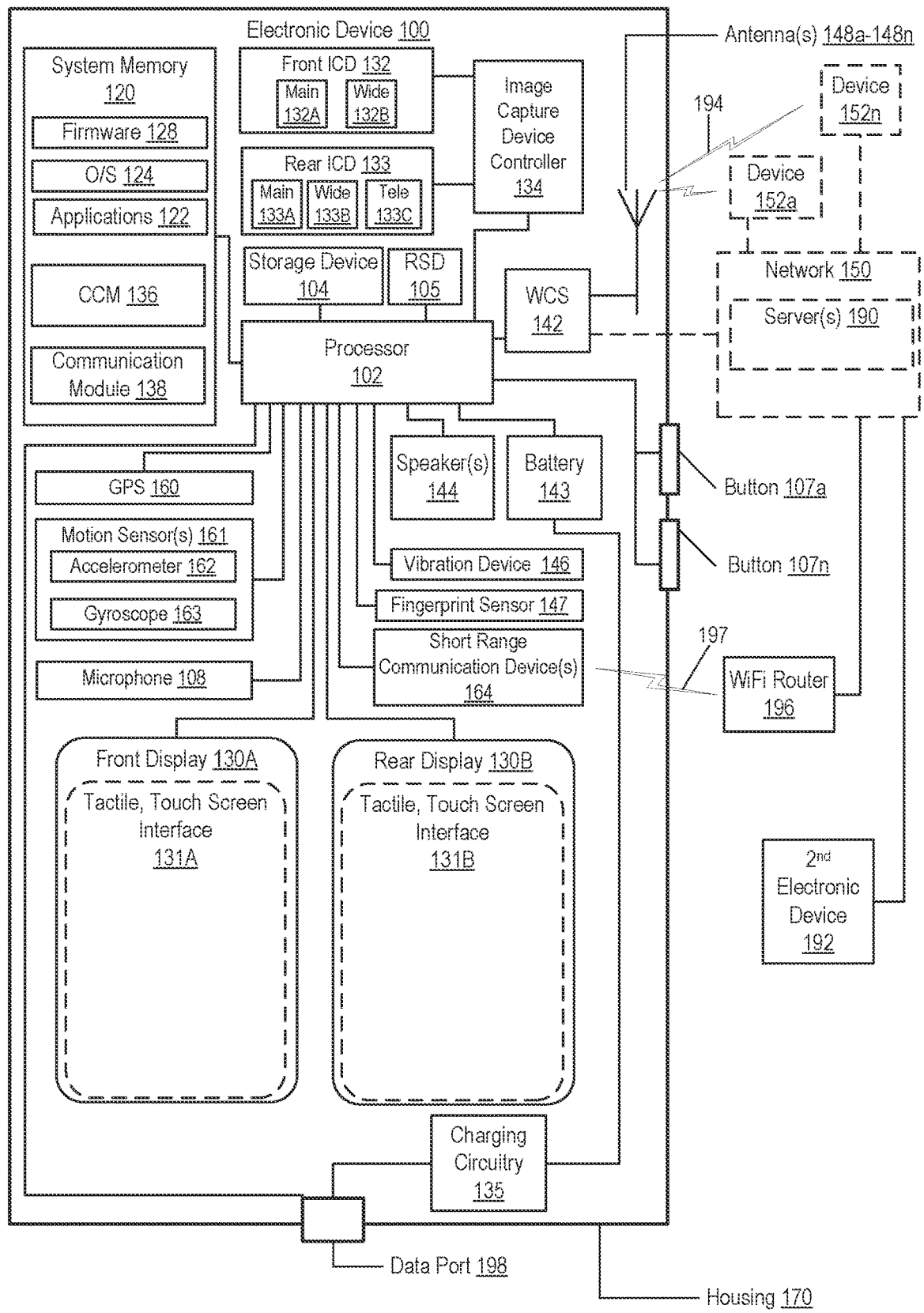
FIG. 1 depicts an example electronic device within which various aspects of the disclosure can be implemented, according to one or more embodiments.

According to one aspect of the disclosure, the illustrative embodiments provide an electronic device, a method, and a computer program product for capturing an image in response to detecting a gesture by a secondary camera. In a first embodiment, an electronic device includes a first camera having a first field of view (FOV) and a second camera having a second FOV. The second FOV is wider than the first FOV. A memory has stored thereon a camera control module (CCM) for controlling the first and second cameras. The electronic device further includes at least one processor that is communicatively coupled to the first camera, the second camera, and to the memory. The at least one processor executes program code of the CCM, which enables the electronic device to, in response to activation of the first camera to a first image capturing mode, activate the second camera to capture an image stream within the second FOV. The at least one processor monitors the image stream to detect specific types of movements and identifies a first gesture among movements detected within the image stream. The at least one processor determines that the first gesture is associated with triggering the first camera to capture images within the first FOV, and in response to determining that the first gesture is associated with triggering the first camera to capture images within the first FOV, captures, via the first camera, a first image within the first FOV and stores the first image to the memory.

According to another embodiment, the method includes, in response to activating, via at least one processor, a first camera having a first field of view (FOV) to a first image capturing mode, a second camera is activated to capture an image stream within a second FOV. The second FOV is wider than the first FOV. The method further includes monitoring the image stream to detect specific types of movements and identifying a first gesture among movements detected within the image stream. The method further includes determining that the first gesture is associated with triggering the first camera to capture images within the first FOV and in response to determining that the first gesture is associated with triggering the first camera to capture images within the first FOV, capturing, via the first camera, a first image within the first FOV and storing the first image to the memory.

According to an additional embodiment, a computer program product includes a computer readable storage device having stored thereon program code that, when executed by at least one processor of an electronic device having a first camera having a first field of view (FOV), a second camera having a second FOV, and a memory, enables the electronic device to complete the functionality of the above-described method.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. It is appreciated that electronic device 100 can be other types of devices that include multiple front camera(s) and/or multiple rear camera(s). Electronic device 100 includes processor 102, which is communicatively coupled to storage device 104, system memory 120, input devices (introduced below), output devices, such as displays 130A and 130B, and image capture device (ICD) controller 134. Processor 102 can include processor resources such as a central processing unit (CPU) that support computing, classifying, processing and transmitting of data and information. Processor 102 can further include graphic processing units (GPU) and digital signal processors (DSP) that also support computing, classifying, processing and transmitting of data and information.

According to one or more embodiments, ICD controller 134 performs or supports functions such as, but not limited to, controlling one or more cameras, activating an active camera from among multiple cameras, capturing images and video, adjusting the camera settings and characteristics (shutter speed, f/stop, ISO exposure, zoom control, etc.) of the active camera, etc. ICD controller 134 can perform these functions in response to commands received from processor 102, which is executing camera control module (CCM) 136. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, camera control module (CCM) 136, and communication module 138. CCM 136 includes program code that is executed by processor 102 to enable electronic device 100 to trigger at least one camera to capture an image in response to identifying an image capture triggering gesture by another camera. Communication module 138 includes program code that is executed by processor 102 to enable electronic device 100 to communicate with other external devices and systems.

Although depicted as being separate from applications 122, CCM 136 and communication module 138 may each be implemented as an application. Processor 102 loads and executes program code stored in system memory 120. Examples of program code that may be loaded and executed by processor 102 include program code associated with applications 122 and program code associated with CCM 136 and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of CCM 136 stored thereon, in addition to other program code. Processor 102 can access RSD 105 to provision electronic device 100 with program code that, when executed by processor 102, the program code causes or configures electronic device 100 to provide the functionality described herein.

Front display 130A and rear display 130B can be a wide variety of display screens or devices, such as liquid crystal displays (LCD) and an organic light emitting diode (OLED) displays. In one embodiment, front display 130A can be mounted to one side (front) of electronic device 100 and rear display 130B can be mounted to another side (rear) of electronic device 100. In some embodiments, displays 130A and 130B can each be a touch screen device that can receive user tactile/touch input. As a touch screen device, front and rear displays 130A and 130B includes tactile, touch screen interfaces 131A and 131B that allow a user to provide input to or to control electronic device 100 by touching features presented within/below the display screens. Tactile, touch screen interface 131A and 131B can be utilized as an input device.

Throughout the disclosure, the term image capturing device is utilized interchangeably to be synonymous with and/or refer to any one of front or rear cameras 132, 133. Front cameras (or image capture device (ICD)) 132 are communicatively coupled to ICD controller 134, which is communicatively coupled to processor 102. ICD controller 134 supports the processing of signals from front cameras 132. Front cameras 132 can each capture images that are within the field of view (FOV) of the respective image capture device 132. Electronic device 100 includes several front cameras 132. Main front camera 132A is a main camera that captures a standard or regular angle FOV. Wide angle front camera 132B is wide-angle camera that can have a wide angle lens that captures a wide angle FOV. Front cameras 132A and 132B can be collectively referred to as front cameras 132A-132B. While two front cameras 132A-132B are shown, electronic device 100 can have more than two front cameras, with two cameras being utilized to implement the features described herein when electronic device 100 is in an open, candy-bar type configuration. Electronic device 100 can also include a single front camera 132, where the features of the disclosure are being implemented solely with rear cameras 133.

Electronic device 100 further includes several rear cameras 133. Main rear camera 133A is a main camera that captures a standard or regular angle FOV. Wide angle rear camera 133B is a wide-angle camera that captures a wide angle FOV. Telephoto rear camera 133C is a telephoto camera that captures a telephoto FOV (zoom or magnified). While three rear cameras are shown, electronic device 100 can have less than three rear cameras, such as having two rear cameras or can have more than three rear cameras, where the features of the disclosure are being implemented using the rear cameras 133A-133C while the device is in a clamshell (or closed) configuration.

Each front camera 132A and 132B and each rear camera 133A, 133B and 133C is communicatively coupled to ICD controller 134, which is communicatively coupled to processor 102. ICD controller 134 supports the processing of signals from front cameras 132A and 132B and rear cameras 133A, 133B and 133C. Front cameras 132A and 132B can be collectively referred to as front cameras 132, and rear cameras 133A, 133B and 133C can be collectively referred to as rear cameras 133, for simplicity.

Electronic device 100 can further include data port 198, charging circuitry 135, and battery 143. Electronic device 100 further includes microphone 108, one or more output devices, such as speakers 144, and one or more input buttons 107a-107n. Input buttons 107a-107n may provide controls for volume, power, and image capture devices 132, 133. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. In one embodiment, communication network devices 152a-152n contain electronic communication equipment to allow communication with electronic device 100. Wireless network 150 further allows electronic device to wirelessly communicate with second electronic device 192, which can be similarly connected to wireless network 150 via one of network communication devices 152*a*-152*n* Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. In one or more embodiment, wireless network 150 can include one or more servers 190 that support exchange of wireless data and video and other communication between electronic device 100 and second electronic device 192.

Electronic device 100 further includes short range communication device(s) 164. Short range communication device(s) 164 is a low powered transceiver that can wirelessly communicate with other devices. Short range communication device(s) 164 can include one or more of a variety of devices, such as a near field communication (NFC) device, a Bluetooth device, and/or a wireless fidelity (Wi-Fi) device. Short range communication device(s) 164 can wirelessly communicate with WiFi router 196 via communication signals 197. In one embodiment, electronic device 100 can communicate with WiFi router 196 wirelessly via short range communication device 164. In an embodiment, WCS 142, antennas 148*a*-148*n* and short-range communication device(s) 164 collectively provide communication interface(s) of electronic device 100. These communication interfaces enable electronic device 100 to communicatively connect to at least one second electronic device 192 via at least one network.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. Front and rear displays 130A, 130B, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites. In one embodiment, the time data and location data can be utilized by processor 102 in determining a current context of a communication.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. Electronic device 100 further includes a housing 170 that contains/ protects the components of the electronic device.

In the description of each of the following figures, reference is also made to specific components illustrated within the preceding figure(s). Similar components are presented with the same reference number.

Figure 2:
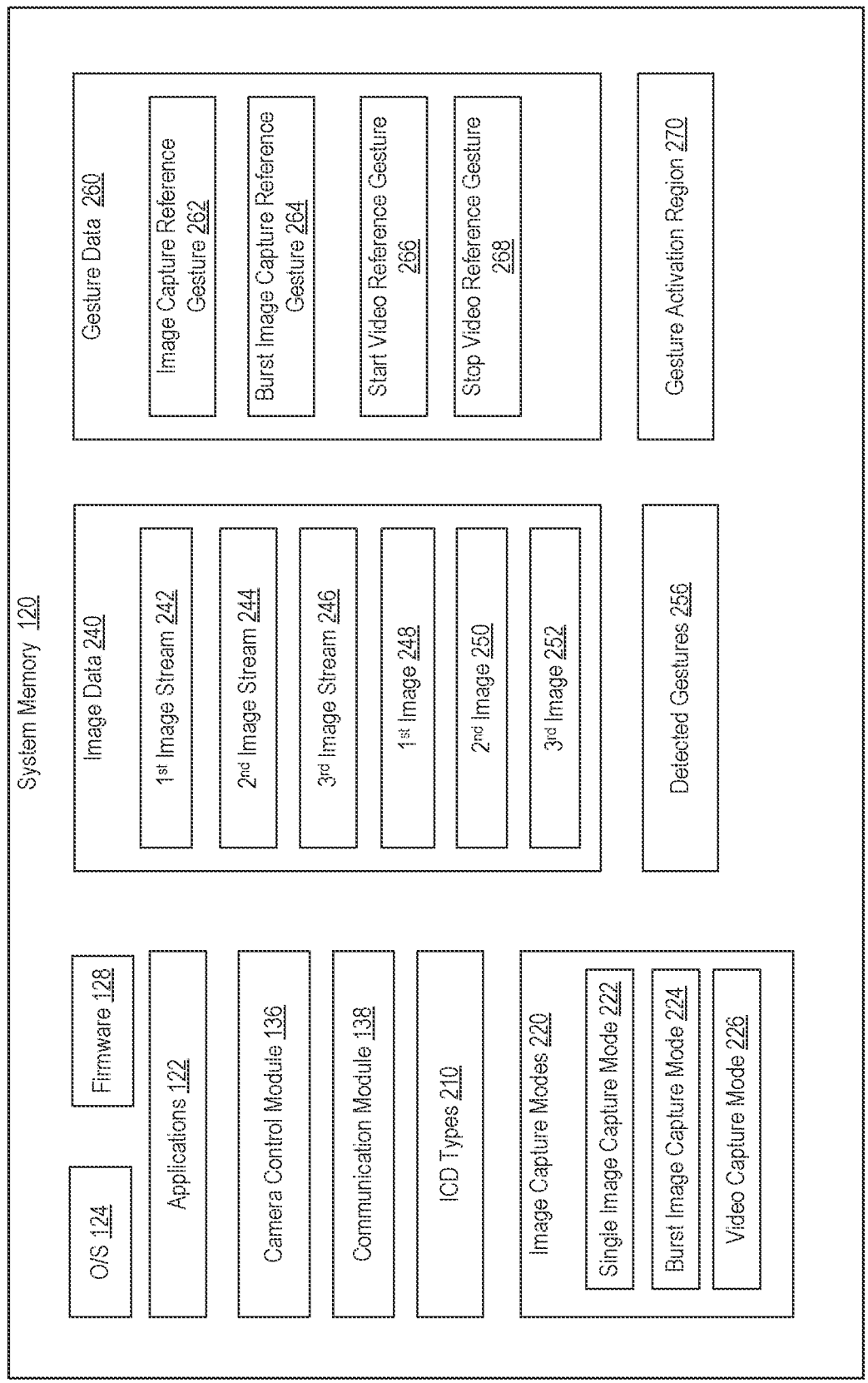
FIG. 2 is a block diagram of example contents of the system memory of the example electronic device of FIG. 1, according to one or more embodiments.

Referring to FIG. 2, there is shown one embodiment of example contents of system memory 120 of electronic device 100. System memory 120 includes data, software, and/or firmware modules, including applications 122, operating system 124, firmware 128, CCM 136, and communication module 138.

CCM 136 includes program code that is executed by processor 102 to enable electronic device 100 to perform the various features of the present disclosure. In one or more embodiments, CCM 136 enables electronic device 100 to, in response to activation of a main camera (i.e., camera 132A or 133A) to capture an image, identify a camera triggering gesture in a gesture activation region using a wide angle camera (i.e., camera 132B or 133B) and trigger the main camera to capture an image in response to identifying the camera triggering gesture. In one or more embodiments, execution of CCM 136 by processor 102 enables/configures electronic device 100 to perform the processes presented in the flowcharts of FIGS. 7 and 8, as will be described below.

Communication module 138 enables electronic device 100 to communicate with wireless network 150 and with other devices, such as second electronic device 192, via one or more of audio, text, and video communications.

System memory 120 further includes ICD (or camera) types 210, and image capture modes 220. Camera types 210 contains information identifying the specific front and rear cameras 132A, 132B, 133A, 133B and 133C that are included in electronic device 100 and/or settings/characteristics of each camera. Image capture modes 220 are modes of operation that can be used with each of the front cameras 132A-133B and rear cameras 133A-133C. The examples presented of image capture modes 220 comprise single image capture mode 222, burst image capture mode 224 and video capture mode 226. In one embodiment, a user can select one of the front cameras 132A-133B or rear cameras 133A-133C as the active camera and then can select one of the image capture modes for use with the selected active camera. Single image capture mode 222 enables electronic device 100 to capture a single image. Burst image capture mode 224 enables electronic device 100 to capture a sequential series of images. For example, electronic device 100 can capture an image every second for 10 seconds for a total of 10 captured images. Video capture mode 226 enables electronic device 100 to capture video data using the selected active camera. It is appreciated that other types of modes can be defined for use by the electronic device 100, and that those additional modes fall within the scope of the disclosure. For example, in addition to single image capture mode and burst image capture mode, additional modes can specify an exact number of images to capture based on detection of an associated gesture, e.g., 3 sequential images with three fingers raised.

System memory 120 further includes image data 240 and detected gestures 256. Image data 240 comprises first image stream 242, second image stream 244, third image stream 246, first image 248, second image 250 and third image 252. First image stream 242, second image stream 244 and third image stream 246, are a stream of images (e.g., multiple still photographs or a continuous video) captured by at least one of wide-angle cameras 132B or 133B. First image 248, second image 250 and third image 252 are images captured by one of main cameras 132A or 133A. In one embodiment, image streams 242, 244 and 246 can contain at least one gesture that triggers one of main cameras 132A or 133A to capture first image 248, second image 250 and third image 252.

Detected gestures 256 are specific movements detected by electronic device 100 within at least one of image streams 242, 244 and 246 that correspond to a camera controlling movement. In one embodiment, electronic device 100 can track specific movements within an image stream made with part of a body, such as a hand, that correspond to detected gestures 256.

System memory 120 further includes gesture data 260. Gesture data 260 contains reference gestures that can be compared to detected gestures 256 to determine if a camera controlling gesture has been identified. In one embodiment, gesture data 260 can include several reference gestures such as image capture reference gesture 262, burst image capture reference gesture 264, start video reference gesture 266 and stop video reference gesture 268. In another embodiment, gesture data 260 can be stored within servers 190 of network 150 and accessed wirelessly and downloaded when needed.

Image capture reference gesture 262 is a movement made with part of a body, such as a hand, that triggers one of main cameras 132A or 133A to capture an image within a FOV of the main camera. Burst image capture reference gesture 264 is a movement made with part of a body, such as a hand, that triggers one of main cameras 132A or 133A to capture a sequential burst of images within a FOV of the main camera. Start video reference gesture 266 is a movement made with part of a body, such as a hand, that triggers one of main cameras 132A or 133A to start the capture of video data or images within a FOV of the main camera. Stop video reference gesture 268 is a movement made with part of a body, such as a hand, that triggers one of main cameras 132A or 133A to stop the capture of video data or images.

System memory 120 further includes gesture activation region 270. Gesture activation region 270 is an area within a portion of the FOV of cameras 132B or 133B where identified gestures can control one of main cameras 132A or 133A. In one embodiment, gesture activation region 270 can be defined as an area outside the FOV captured by main front camera 132A and within the FOV captured by wide angle front camera 132B. In an additional embodiment, gesture activation region 270 can be defined as an area outside the FOV captured by main rear camera 133A and within the FOV captured by wide angle rear camera 133B.

Turning to FIG. 3A, details of the front surface of electronic device 100 are shown. In one embodiment, electronic device 100 can be a foldable electronic device. In FIG. 3A, electronic device 100 is shown in a fully open position. Electronic device 100 includes a housing 170 that contains the components of electronic device 100. Housing 170 includes a top 310, bottom 312, and opposed sides 314 and 318. Housing 170 further includes a front surface 320, a hinge section 322, lower portion 340 and upper portion 342. Hinge section 322 rotatably connects lower portion 340 to upper portion 342. Lower portion 340 and upper portion 342 can rotate about hinge section 322. Lower portion 340 and upper portion 342 can also be referred to respectively as first housing 340 and second housing 342, given that housing 170 is composed of the two separated portions (340, 342) interconnected by hinge section 322. Display 130A extends across lower portion 340, upper portion 342 and hinge section 322 forming front surface 320. Located on front surface 320 of electronic device 100 are microphone 108, display 130A, main front camera 132A, wide angle front camera 132B, and speaker 144 are located on/at front surface 320.

With additional reference to FIG. 3B, additional details of the rear surface of electronic device 100 are shown. In FIG. 3B, electronic device 100 is shown in a fully open position. Housing 170 further includes a rear surface 330 including first rear surface 330A of lower portion 340 and second rear surface 330B of upper portion 342 that are separated by hinge section 322. Disposed on/at upper rear surface 330B of electronic device 100 are rear display 130B, main rear camera 133A, wide angle rear camera 133B, and telephoto rear camera 133C. In the illustrative embodiment, rear display 130B occupies only upper rear surface 330B.

Referring to FIG. 3C, electronic device 100 is shown in a partially folded position. Electronic device 100 including display 130A and housing 170 can be formed from flexible materials that allow electronic device 100 to be folded. Electronic device 100 can be folded by moving lower portion 340 and upper portion 342 of electronic device 100 toward each other about hinge section 322. As electronic device 100 is folded, opposing portions of display 130A (FIG. 3A) face each other.

Turning to FIG. 3D, details of electronic device 100 in a fully folded position are shown. After electronic device 100 has been folded, rear surface 330 presents as an outer surface of electronic device 100. Second rear surface 330B outwardly presents rear display 130B and rear cameras 133A-132C, which remain accessible for viewing and use.

Figure 4A:
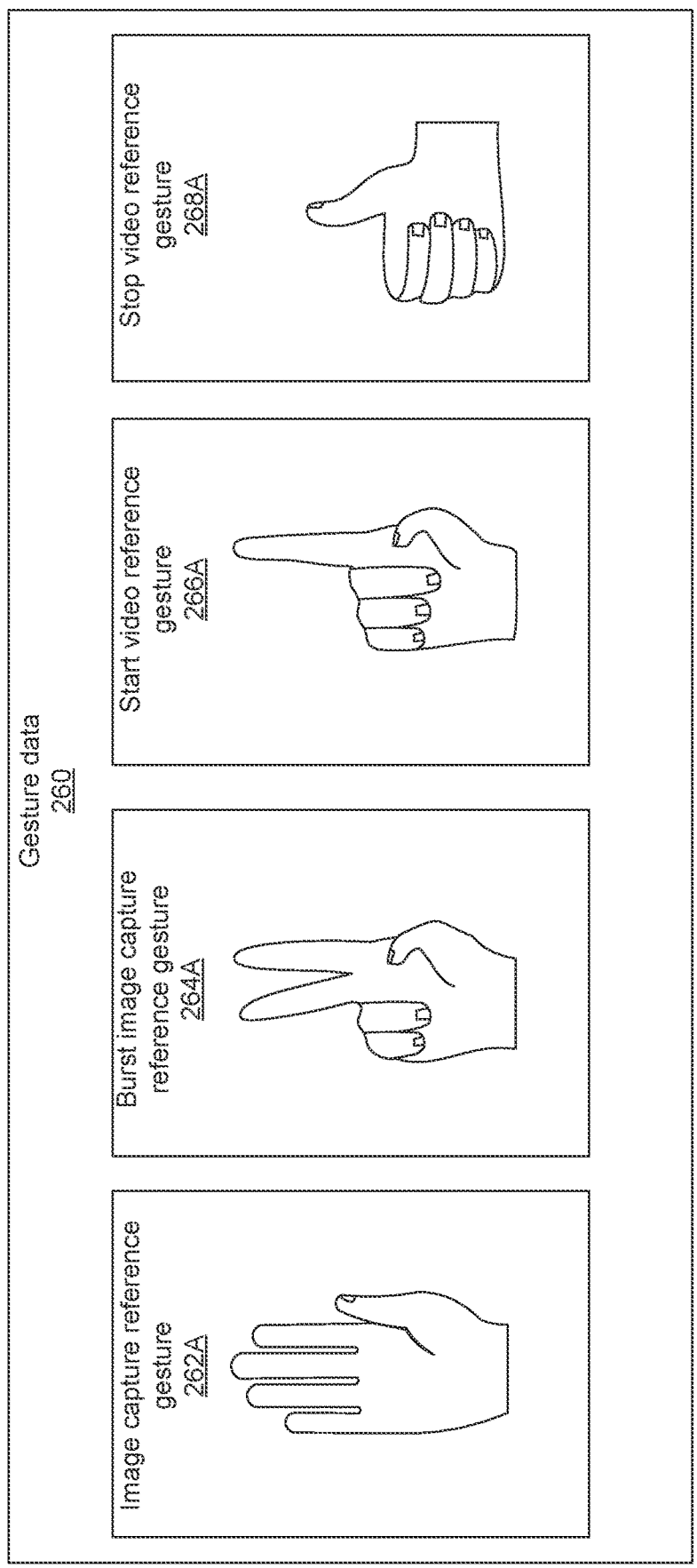
FIG. 4A is an example illustration of a front view of various types of hand gestures that can be used to control one or more cameras, according to one or more embodiments.

With reference to FIG. 4A, additional details of gesture data 260 are shown. Gesture data 260 contains reference gestures that can be compared to detected gestures 256 to determine if a camera controlling gesture has been identified. In one embodiment, gesture data 260 includes image capture reference gesture 262A that depicts a hand orientation in the form of an open hand with the palm facing forward and indicating that a single image is to be captured. Burst image capture reference gesture 264A depicts a hand orientation in the form of two fingers adjacent to each other extended from a hand facing forward and indicating that multiple images are to be captured. Start video reference gesture 266A depicts a hand orientation in the form of a single index finger extended from a forward facing hand. Start video reference gesture 266A triggers at least one camera to capture video images. Stop video reference gesture 268A depicts a hand orientation in the form of a thumb extending upwardly from a forward facing closed hand. Stop video reference gesture 268A triggers at least one camera to stop the capture of video images. Each of the illustrated gestures are provided as a right hand of a user making the gesture. The user would then be holding the electronic device with their left hand when taking a self-photo.

Figure 4B:
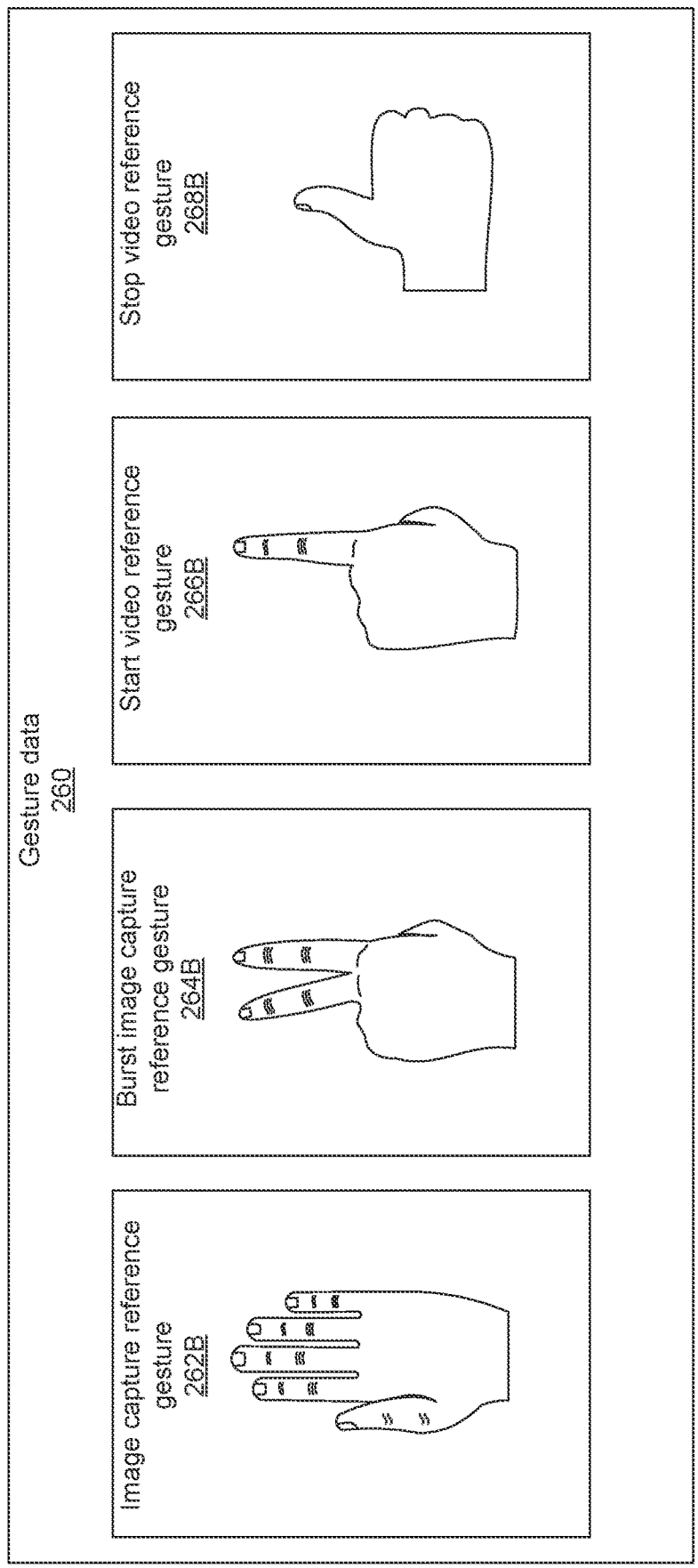
FIG. 4B is an example illustration of a rear view of various types of hand gestures that can be used to control one or more cameras, according to one or more embodiments.

Turning to FIG. 4B, additional details of gesture data 260 are shown. In one embodiment, gesture data 260 includes image capture reference gesture 262B that depicts a hand orientation in the form of an open hand with the palm facing backward and indicating that a single image is to be captured. Burst image capture reference gesture 264B depicts a hand orientation in the form of two fingers adjacent to each other extended from a hand facing backward and indicating multiple images to be captured. Start video reference gesture 266B depicts a hand orientation in the form of a single index finger extended from a backward facing hand. Start video reference gesture 266B triggers at least one camera to capture video images. Stop video reference gesture 268B depicts a hand orientation in the form of a thumb extending upwardly from a backward facing closed hand. Stop video reference gesture 268B triggers at least one camera to stop the capture of video images. Each of the illustrated gestures are provided as a right hand of a user making the gesture. The user would then be holding the electronic device with their left hand when taking a self-photo.

Figure 5A:
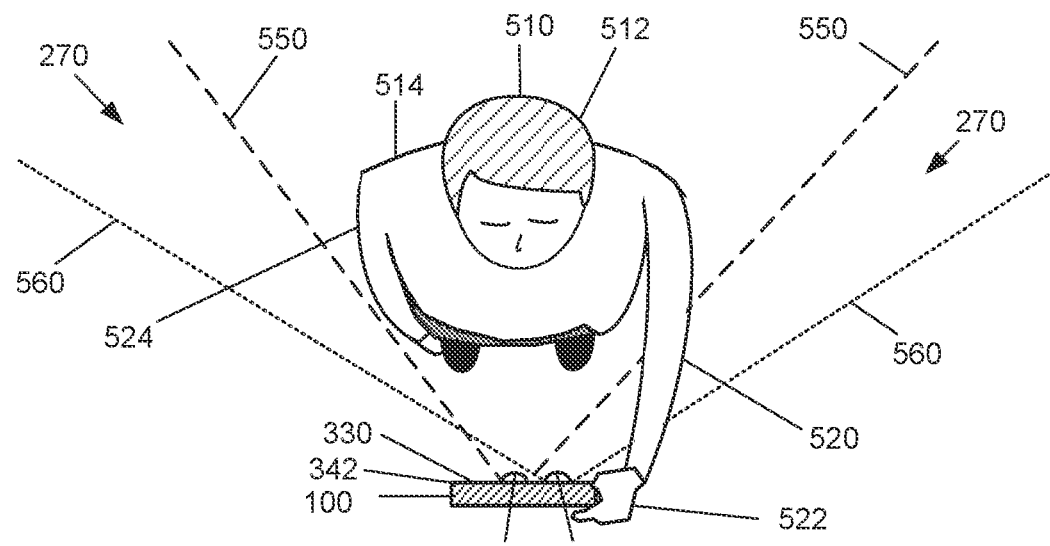
FIG. 5A is an example top view illustration of a camera of an electronic device being positioned to take a self-photo, according to one or more embodiments.

Referring to FIG. 5A, electronic device 100 is shown positioned to capture an image, such as a self-photo, of an electronic device user 510. Electronic device user 510 can hold electronic device 100, out in front in a position facing electronic device user 510, using left arm 520 and left hand 522. Left hand 522 can grasp, hold and manipulate electronic device 100. Right arm 524 is located next to torso 514.

In FIG. 5A, electronic device 100 is shown in a fully folded position with outer surface 330 of upper portion 342 facing user 510 of electronic device 100. Main rear camera 133A and wide-angle rear camera 133B are oriented facing electronic device user 510. Main rear camera 133A captures images within a regular angle field of view (FOV) 550 and wide-angle rear camera 133B captures images within a wide angle FOV 560. Wide angle FOV 560 is larger or wider than regular angle FOV 550. Wide-angle rear camera 133B with wide angle FOV 560 captures images that include a larger captured image area than images captured by main rear camera 133A with regular angle FOV 550.

In the example embodiment of FIG. 5A, main rear camera 133A has been activated in an image capturing mode (e.g., single image capture mode 222) by user selection via touch screen interface 131B. In one embodiment, electronic device 100 can be positioned such that the head 512 and at least a portion of torso 514 of electronic device user 510 are centered within regular angle FOV 550 when taking a self-photo.

Gesture activation region 270 is an area that is outside regular angle FOV 550 captured by main rear camera 133A and within wide angle FOV 560 captured by wide angle rear camera 133B. In other words, gesture activation region 270 is located between the cone shaped regions defined by regular angle FOV 550 and wide angle FOV 560.

In another embodiment, electronic device 100 can be in an open unfolded position such that main front camera 132A and wide-angle front camera 132B can be used in the example embodiment of FIG. 5A to capture an image such as a self-photo using a camera controlling gesture. The description below of the operation of electronic device 100 to capture images using detected gestures will be with reference to electronic device 100 in a fully folded position.

Figure 5B:
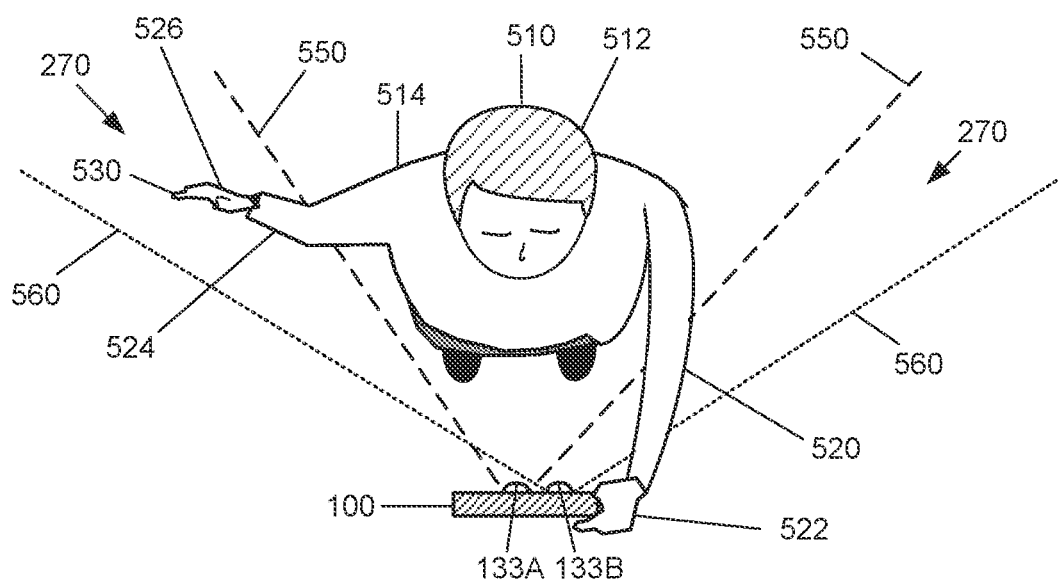
FIG. 5B is an example top view illustration of a camera of an electronic device being triggered by a gesture to capture a self-photo, according to one or more embodiments.

Turning to FIG. 5B, electronic device 100 is shown with electronic device user 510 making a hand gesture 530 that triggers electronic device 100 to capture an image. Electronic device user 510 is shown extending right arm 524 and right hand 526 into gesture activation region 270. Right hand 526 is shown making hand gesture 530 in gesture activation region 270. Hand gesture 530 is in the hand orientation of an open hand with the palm facing forward. Hand gesture 530 can match image capture reference gesture 262A. After determining that hand gesture 530 is in gesture activation region 270 and matches image capture reference gesture 262A, electronic device 100 triggers main rear camera 133A to capture first image 248 within regular angle FOV 550. If the hand gesture 530 is outside of the gesture activation region 270, no triggering of the camera to capture images occurs.

In one embodiment, CCM 136 enables electronic device 100 to track movements within gesture activation region 270 via a first image stream 242 captured by wide angle rear camera 133B. Electronic device 100 can track movements of right hand 526 and identify the movements of the hand as a detected gesture 256 that corresponds to hand gesture 530. Electronic device 100 can compare the detected gesture 256 (e.g., hand gesture 530) to gesture data comprising at least one reference gesture (e.g., image capture reference gesture 262A) associated with triggering the main rear camera 133A to capture an image.

Electronic device 100 can determine if the detected gesture 256 (e.g., hand gesture 530) matches image capture reference gesture 262A. In response to detected gesture 256 matching image capture reference gesture 262A, electronic device 100 initiates the triggering of the main rear camera 133A to capture first image 248 within regular angle FOV 550. In one embodiment, electronic device 100 can trigger ICD controller 134 to activate main rear camera 133A to capture first image 248. ICD controller 134 receives the trigger for activating main rear camera 133A and activates the main rear camera accordingly.

Figure 6:
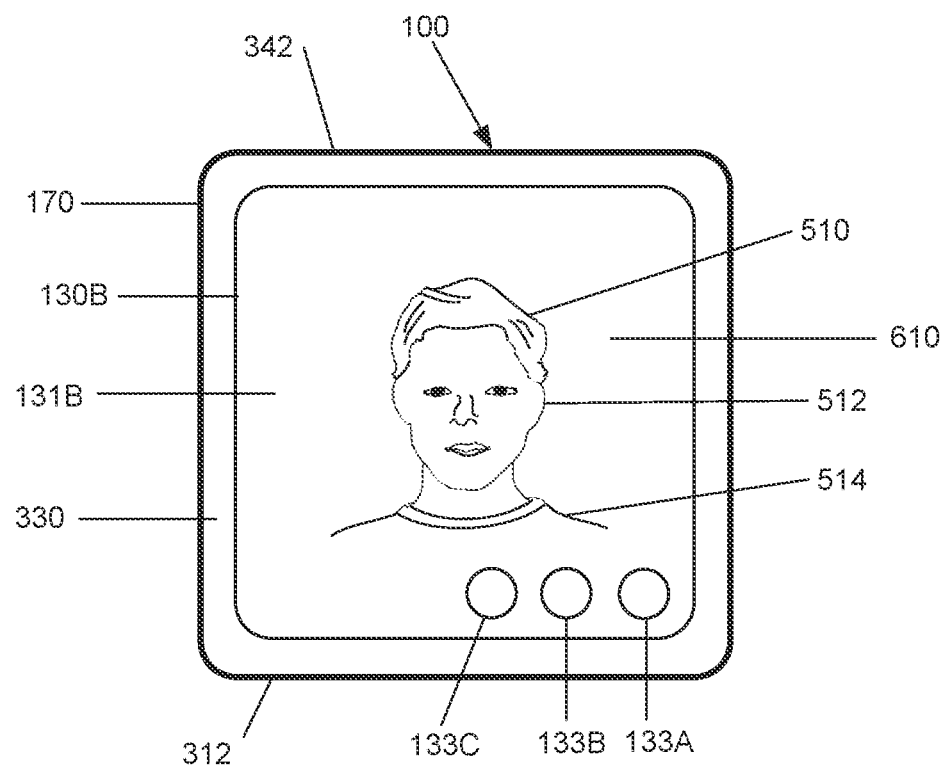
FIG. 6 illustrates content on a display of the electronic device of FIG. 5B, after a self-photo has been captured using one or more gestures to initiate the capture of the image, according to one or more embodiments.

With reference now to FIG. 6, electronic device 100 is illustrated with an example graphical user interface (GUI) 610 presented on display 130B after main rear camera 133A has been triggered to capture first image 248. GUI 610 presents the captured first image 248 of a self-photo of user 510 of electronic device 100. GUI 610 includes the head 512 and at least a portion of torso 514 of user 510 of the electronic device.

According to one aspect of the disclosure, CCM 136 enables electronic device 100 to detect the activation, via processor 102, of main rear camera 133A having a regular angle FOV 550 to a first image capturing mode (e.g., single image capturing mode 222). In response to the activation of main rear camera 133A to a first image capturing mode, a wide-angle rear camera 133B is activated to capture a first image stream 242 within wide angle FOV 560. The wide angle FOV 560 is wider than the regular angle FOV 550. CCM 136 further enables electronic device 100 to monitor the first image stream 242 to detect specific types of movements and to identify a detected gesture 256 (i.e., hand gesture 530) among movements detected within the image stream. CCM 136 further enables electronic device 100 to determine that the detected gesture 256 is associated with triggering main rear camera 133A to capture images within the regular angle FOV 550. In response to determining that the detected gesture 256 is associated with triggering main rear camera 133A to capture images within regular angle FOV 550, electronic device 100 captures, via main rear camera 133A, first image 248 within regular angle FOV 550 and stores first image 248 to system memory 120.

According to another aspect of the disclosure, electronic device 100 can detect camera controlling gestures in a gesture activation region 270 and automatically trigger a main camera to capture images using the main camera. The camera controlling gesture is detected in the gesture activation region 270 that is within the FOV of a wide-angle camera and is out of the FOV of the regular angle camera such that the captured image does not include the detected gesture. According to one aspect of the disclosure, the camera controlling movements or gestures can be movement of a body part (i.e., hand gesture 530) outside of the regular angle FOV 550 such that the gesture that triggers activation of the main rear camera 133A is not included within the captured first image 248.

Additionally, in one or more embodiments, the use of camera controlling gestures with electronic device 100 frees the user from the task of reaching for the shutter button or shutter icon when the electronic device is extended away from the user. If electronic device 100 is extended away from the user, shaking and movement of electronic device 100 can cause the camera aim to be shifted off of the desired subject, resulting in images where the subject is off center. The disclosed use of detecting, via a secondary camera, gestures being performed with an off-hand will mitigate these issues.

Figure 7:
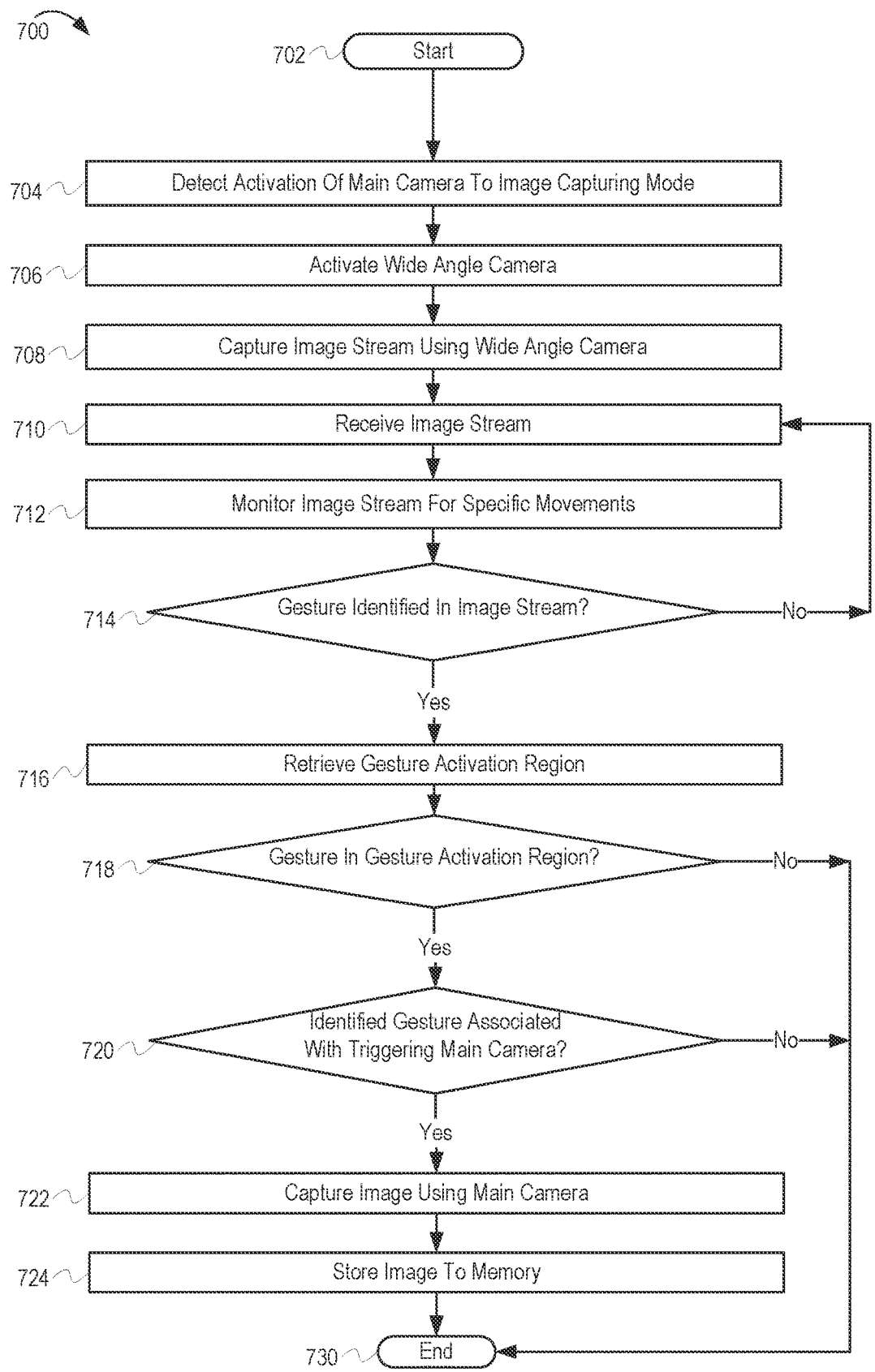
FIG. 7 depicts a flowchart of a method by which an electronic device controls a pair of cameras to capture a self-photo based on detected gestures, according to one or more embodiments.
Figure 8:
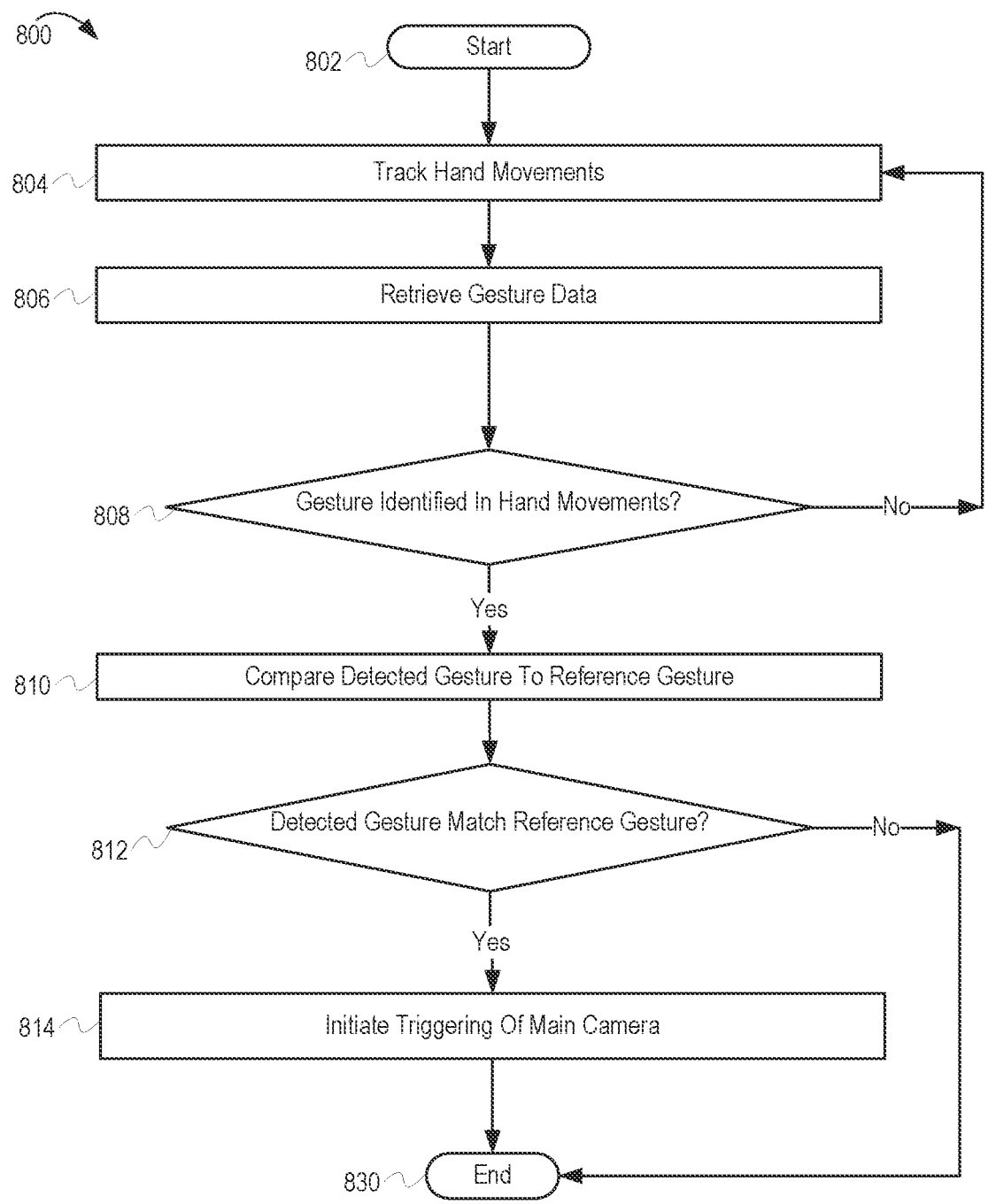
FIG. 8 depicts a flowchart of a method by which an electronic device tracks hand movements and identifies gestures based on the hand movements, according to one or more embodiments.

FIG. 7 depicts method 700 by which electronic device 100 triggers a camera to capture images in response to the detection of a camera controlling gesture in a gesture activation region. FIG. 8 depicts method 800 by which electronic device 100 tracks hand movements and identifies gestures based on specific hand movements. The description of methods 700 and 800 will be described with reference to the components and examples of FIGS. 1-6B.

The operations depicted in FIGS. 7 and 8 can be performed by electronic device 100 or any suitable electronic device that includes main and wide-angle cameras and the one or more functional components of electronic device 100 that provide/enable the described features. One or more of the processes of the methods described in FIGS. 7 and 8 may be performed by processor 102 executing program code associated with CCM 136.

With specific reference to FIG. 7, method 700 begins at the start block 702. At block 704, processor 102 detects the activation of the main rear camera 133A to a first image capturing mode (e.g., single image capturing mode 222). The main rear camera 133A has a regular angle FOV 550. The main rear camera 133A can be placed in the image capturing mode by a user selection of at least one of the image capturing modes 220 via touch screen interface 131B. In response to the activation of the main rear camera 133A to a first image capturing mode, processor 102 activates wide angle rear camera 133B (block 706). Processor 102 uses wide angle rear camera 133B to capture first image stream 242 within wide angle FOV 560 (block 708). The wide angle FOV 560 of wide-angle rear camera 133B is wider than the regular angle FOV 550 of main rear camera 133A.

Processor 102 receives the image stream from wide angle rear camera 133B (block 710) and monitors the first image stream 242 to detect specific types of movements (block 712). Processor 102 determines if a detected gesture 256 (e.g., hand gesture 530) has been identified among the movements detected within the image stream (decision block 714). In response to determining that a gesture has not been identified among the movements detected within the image stream, processor 102 continues to receive first image stream 242 (block 710) and to monitor the image stream for specific movements (block 712). In response to determining that a detected gesture 256 has been identified among the movements within the image stream, processor 102 retrieves gesture activation region 270 from system memory 120 (block 716).

In another embodiment, instead of retrieving gesture activation region 270 from system memory 120, processor 102 can compare the contents of image streams from the regular angle FOV 550 of main rear camera 133A and the wide angle FOV 560 of wide-angle camera 133B to determine if a detected gesture is within a region that triggers main rear camera 133A.

Processor 102 determines if the detected gesture 256 is within the gesture activation region 270 (decision block 718). The gesture activation region 270 is the area on the left and right sections of wide angle FOV 560 that are within wide angle FOV 560 of wide-angle rear camera 133B and are outside of the regular angle FOV 550 of main rear camera 133A. In response to determining that the detected gesture 256 is not within the gesture activation region 270, method 700 ends at end block 730. In response to determining that the detected gesture 256 is within the gesture activation region 270, processor 102 determines that the identified detected gesture 256 (e.g., hand gesture 530) is associated with triggering the main rear camera 133A to capture at least one image within the regular angle FOV 550 (decision block 720).

In response to determining that the identified detected gesture 256 is not associated with triggering the main rear camera 133A to capture at least one image, method 700 terminates at end block 730. In response to determining that the identified detected gesture 256 is associated with triggering the main rear camera 133A to capture at least one image, processor 102 captures, via main rear camera 133A, first image 248 within regular angle FOV 550 (block 722) and stores first image 248 to system memory 120 (block 724). Method 700 ends at end block 730.

Referring to FIG. 8, there is presented method 800 by which electronic device 100 tracks hand movements and identifies gestures based on specific hand movements. In one embodiment, method 800 corresponds to the steps performed in decision block 714 of FIG. 7. Method 800 begins at the start block 802. At block 804, processor 102 tracks movements of a hand (e.g., right hand 526) within first image stream 242 captured by wide angle rear camera 133B. Processor 102 retrieves gesture data 260 from system memory 120 (block 806). Processor 102 determines if the tracked movements of the hand are identified as a detected gesture 256 (decision block 808). In response to determining that the tracked movements of the hand are not identified as a detected gesture 256, processor 102 returns to block 804 to continue tracking movements of a hand within first image stream 242 captured by wide angle rear camera 133B.

In response to determining that the tracked movements of the hand are identified as a detected gesture 256, processor 102 compares the detected gesture 256 (e.g., hand gesture 530) to the gesture data 260 to determine if the detected gesture is a camera controlling gesture (block 810). The gesture data 260 includes at least one reference gesture (i.e., image capture reference gesture 262A) associated with triggering main rear camera 133A to capture an image.

At decision block 812, processor 102 determines if the detected gesture 256 matches at least one of the reference gestures contained in gesture data 260. In response to determining that the detected gesture 256 does not match at least one of the reference gestures contained in gesture data 260, method 800 ends at end block 830. In response to determining that the detected gesture 256 matches at least one of the reference gestures contained in gesture data 260, processor 102 initiates the triggering of the main rear camera 133A to capture images or video based on the identified gesture (block 814). In an example embodiment, the detected gesture 256 (e.g., hand gesture 530) can be matched to image capture reference gesture 262A that depicts a hand orientation in the form of an open hand with the palm facing outwards. After determining that hand gesture 530 matches image capture reference gesture 262A, electronic device 100 initiates the triggering of main rear camera 133A to capture first image 248 within regular angle FOV 550. Method 800 then terminates at end block 830.

In the above-described methods of FIGS. 7 and 8, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a first camera having a first field of view (FOV);
a second camera having a second FOV, the second FOV being wider than the first FOV;
a memory having stored thereon a camera control module (CCM) for controlling the first and second cameras; and
at least one processor communicatively coupled to the first camera, the second camera, and to the memory, the at least one processor executing program code of the CCM, which enables the electronic device to:
in response to activation of the first camera to a first image capturing mode:
activate the second camera to capture an image stream within the second FOV;
monitor the image stream to track movements of a hand and detect specific types of hand movements;
identify the movements of the hand as a first gesture detected within the image stream;
compare the first gesture to gesture data comprising at least one reference gesture associated with triggering the first camera to capture images;
determine that the first gesture matches a reference gesture associated with triggering the first camera to capture images within the first FOV; and
in response to determining that the first gesture matches the reference gesture associated with triggering the first camera to capture images within the first FOV: triggering of the first camera to capture images within the first FOV; capture, via the first camera, a first image within the first FOV; and store the first image to the memory.

2. The electronic device of claim 1, wherein in response to identifying the first gesture among the specific types of hand movements within the image stream, the at least one processor is further enabled to:
determine if the first gesture is contained within a gesture activation region, the gesture activation region corresponding to an area outside the first FOV captured by the first camera and within the second FOV captured by the second camera; and in response to determining that the first gesture is contained within the gesture activation region, initiating the capture of the first image by the first camera.

3. The electronic device of claim 2, wherein no triggering of the first camera to capture the first image occurs if the first gesture is outside of the gesture activation region and gestures that trigger activation of the first camera are not included within the captured first image.

4. The electronic device of claim 1, wherein both the first FOV captured in the first image and the second FOV captured in the image stream include at least a portion of a subject making the first gesture.

5. The electronic device of claim 1, wherein the specific hand movements comprise movement of a body part outside of the first FOV such that the first gesture that triggers activation of the first camera is not included within the captured first image.

6. The electronic device of claim 1, wherein the first camera is a regular angle camera and the first FOV is a regular angle FOV, and second camera is a wide angle camera and the second FOV is a wide angle FOV.

7. The electronic device of claim 1, wherein the electronic device is a foldable electronic device and the first camera and the second camera are mounted to a first surface of the foldable electronic device.

8. The electronic device of claim 1, wherein the first gesture triggers the first camera to capture a single first image, a second gesture triggers the first camera to capture video images and a third gesture triggers the first camera to end the capture of video images.

9. A method comprising:
in response to activating, via at least one processor, a first camera having a first field of view (FOV) to a first image capturing mode:
   activating a second camera to capture an image stream within a second FOV, the second FOV being wider than the first FOV;
   monitoring the image stream to track movements of a hand and detect specific types of hand movements;
   identifying the movements of the hand as a first gesture detected within the image stream;
   comparing the first gesture to gesture data comprising at least one reference gesture associated with triggering the first camera to capture images;
   determining that the first gesture matches a reference gesture associated with triggering the first camera to capture images within the first FOV; and
   in response to determining that the first gesture matches a reference gesture associated with triggering the first camera to capture images within the first FOV: triggering of the first camera to capture images within the first FOV; capturing, via the first camera, a first image within the first FOV; and storing the first image to a memory.

10. The method of claim 9, wherein in response to identifying the first gesture among the specific types of hand movements within the image stream, the method further comprises:
determining if the first gesture is contained within a gesture activation region, the gesture activation region corresponding to an area outside the first FOV captured by the first camera and within the second FOV captured by the second camera; and in response to determining that the first gesture is contained within the gesture activation region, initiating the capture of the first image by the first camera.

11. The method of claim 10, wherein no triggering of the first camera to capture the first image occurs if the first gesture is outside of the gesture activation region and gestures that trigger activation of the first camera are not included within the captured first image.

12. The method of claim 9, wherein both the first FOV captured in the first image and the second FOV captured in the image stream include at least a portion of a subject making the first gesture.

13. The method of claim 9, wherein the specific hand movements comprise movement of a body part outside of the first FOV such that the first gesture that triggers activation of the first camera is not included within the captured first image.

14. The method of claim 9, wherein the first camera is a regular angle camera and the first FOV is a regular angle FOV, and second camera is a wide angle camera and the second FOV is a wide angle FOV.

15. The method of claim 9, wherein the first camera and the second camera are mounted to a first surface of a foldable electronic device.

16. The method of claim 9, wherein the first gesture triggers the first camera to capture a single first image, a second gesture triggers the first camera to capture video images and a third gesture triggers the first camera to end the capture of video images.

17. A computer program product comprising:
a non-transitory computer readable storage device having stored thereon program code which, when executed by at least one processor of an electronic device having a first camera having a first field of view (FOV), a second camera having a second FOV, and a memory, enables the electronic device to complete the functionality of:
   in response to activating the first camera to a first image capturing mode:
      activating the second camera to capture an image stream within the second FOV, the second FOV being wider than the first FOV;
      monitoring the image stream to track movements of a hand and detect specific types of hand movements;
      identifying the movements of the hand as a first gesture detected within the image stream;
      comparing the first gesture to gesture data comprising at least one reference gesture associated with triggering the first camera to capture images;
      determining that the first gesture matches a reference gesture associated with triggering the first camera to capture images within the first FOV; and
      in response to determining that the first gesture matches a reference gesture associated with triggering the first camera to capture images within the first FOV: triggering of the first camera to capture images within the first FOV; capturing, via the first camera, a first image within the first FOV; and storing the first image to a memory.

18. The computer program product of claim 17, wherein in response to identifying the first gesture among the specific types of hand movements within the image stream, the program code further enables the electronic device to complete the functionality of:
determining if the first gesture is contained within a gesture activation region, the gesture activation region corresponding to an area outside the first FOV captured by the first camera and within the second FOV captured by the second camera; and in response to determining that the first gesture is contained within the gesture activation region, initiating the capture of the first image by the first camera, wherein no triggering of the first camera to capture the first image occurs if the first gesture is outside of the gesture activation region and gestures that trigger activation of the first camera are not included within the captured first image.

19. The computer program product of claim 17, wherein the specific hand movements comprise movement of a body part outside of the first FOV such that the first gesture that triggers activation of the first camera is not included within the captured first image.

20. The computer program product of claim 17, wherein the first camera is a regular angle camera and the first FOV is a regular angle FOV, and second camera is a wide angle camera and the second FOV is a wide angle FOV.

* * * * *